(12) United States Patent
Paul et al.

(10) Patent No.: US 8,422,100 B2
(45) Date of Patent: Apr. 16, 2013

(54) METHOD AND APPARATUS FOR CONVERTING COLOR-DESCRIBING INPUT DATA, WHICH ARE SUITABLE FOR GRAPHICAL OUTPUT USING AN OUTPUT DEVICE, INTO COLOR-DESCRIBING ADAPTED OUTPUT DATA

(75) Inventors: Andreas Paul, Vaterstetten (DE); Benno Petschik, Markt Schwaben (DE); Rüdiger Lippok, Eching (DE)

(73) Assignee: Océ Printing Systems GmbH, Poing (DE)

( * ) Notice: Subject to any disclaimer, the term of this patent is extended or adjusted under 35 U.S.C. 154(b) by 1246 days.

(21) Appl. No.: 12/280,179

(22) PCT Filed: Feb. 23, 2007

(86) PCT No.: PCT/EP2007/051767
§ 371 (c)(1), (2), (4) Date: Aug. 21, 2008

(87) PCT Pub. No.: WO2007/096423
PCT Pub. Date: Aug. 30, 2007

(65) Prior Publication Data
US 2009/0021808 A1    Jan. 22, 2009

(30) Foreign Application Priority Data
Feb. 24, 2006 (DE) .......................... 10 2006 008 765

(51) Int. Cl.
*G03F 3/08* (2006.01)

(52) U.S. Cl.
USPC ........... 358/518; 382/162; 382/237; 382/269; 358/1.9; 358/533

(58) Field of Classification Search ........................ None
See application file for complete search history.

(56) References Cited

U.S. PATENT DOCUMENTS

| | | | |
|---|---|---|---|
| 5,774,146 A | 6/1998 | Mizutani | |
| 6,285,462 B1 * | 9/2001 | Balasubramanian et al. | . 358/1.9 |
| 6,360,007 B1 | 3/2002 | Robinson et al. | |
| 7,312,893 B2 | 12/2007 | Bestmann et al. | |

(Continued)

FOREIGN PATENT DOCUMENTS

| | | |
|---|---|---|
| DE | 697 07 172 T2 | 9/1997 |
| DE | 102 05 476 A1 | 8/2003 |

(Continued)

*Primary Examiner* — Twyler Haskins
*Assistant Examiner* — Christopher D Wait
(74) *Attorney, Agent, or Firm* — Schiff Hardin LLP

(57) ABSTRACT

In a method to convert color-describing input print data suitable for graphical output with aid of an output apparatus into color-describing output print data, color proportions, defined by the input print data, of at least one region to be inked with at least two color separations, are determined, and a color space value to be generated with aid of the color separations is determined. An association rule is determined to convert the input print data into the output print data while retaining the color space value. A total areal coverage of areal coverages defined by the output print data of the color separations to generate the color space value is reduced relative to areal coverages of the color separations defined by the input print data. The input print data is converted into the output print data with aid of the determined association rule.

17 Claims, 12 Drawing Sheets

U.S. PATENT DOCUMENTS

| | | |
|---|---|---|
| 2002/0005965 A1 | 1/2002 | Nagae et al. |
| 2002/1139892 | 8/2002 | Chang et al. |
| 2002/0140754 A1 | 10/2002 | Someno |

FOREIGN PATENT DOCUMENTS

| | | |
|---|---|---|
| EP | 0 793 377 | 9/1997 |
| EP | 1 001 609 | 6/2000 |
| EP | 1 128 255 A2 | 8/2001 |
| EP | 1 365 579 A2 | 11/2003 |
| EP | 1 589 746 A2 | 10/2005 |

* cited by examiner

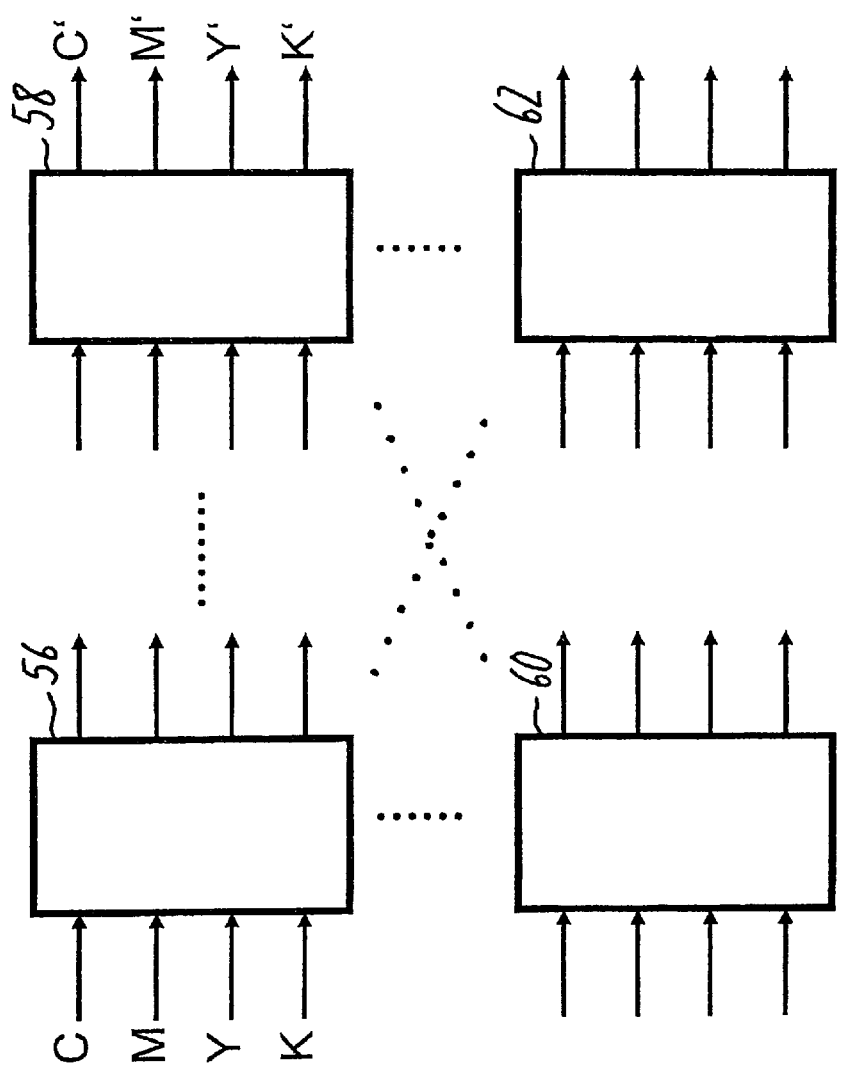

METHOD AND APPARATUS FOR CONVERTING COLOR-DESCRIBING INPUT DATA, WHICH ARE SUITABLE FOR GRAPHICAL OUTPUT USING AN OUTPUT DEVICE, INTO COLOR-DESCRIBING ADAPTED OUTPUT DATA

BACKGROUND

The preferred embodiment concerns a method and a device to convert color-describing input data suitable for graphical output with the aid of an output apparatus into color-describing output data. Conversion methods are known to convert RGB input data displayable with the aid of a monitor into CMYK output data that can then be output with the aid of a typical printer. A conversion of color data of a first color model into color data of a second color model thus occurs in this known method. The primary colors of the RGB color model are red, green and blue. The colors of the CMYK color model are cyan, magenta, yellow and black wherein the color black serves as a contrast color (what is known as a key color) in color mixtures of the color model.

Subtractive and/or additive color mixtures can be generated with the aid of the primary colors of the respective color model, wherein a color space is defined by the generatable mixture colors. Given typical multicolor printing, the individual primary colors are not mixed but rather are printed in succession in what are known as color separations on the substrate material to be printed or an intermediate image carrier to collect the color separations. A color separation that defines the regions of the print image to be generated that are to be inked with this primary color is generated for each of the primary colors. The individual color separations are advantageously printed slightly offset from one another in a point raster (what is known as a print raster), whereby each color point comprises one pixel of the primary colors used to generate the color point.

The different principles of color mixing in monitor display and in the printing process (in particular in electrophotographic printing) makes it necessary to convert the image data generated or processed on the monitor on the basis of the RGB color model into image data of the CMYK color model. What are known as profiles in which a mixed color of the original color model is associated with a mixed color of the target color model are used for such a conversion. These profiles typically comprise tables with a plurality of color associations of mixed colors of the origin system and mixed colors of the target system. For specific output apparatuses, these profiles can be adapted to the output apparatus. Such an adaptation is also designated as a color calibration and can be implemented with what are known as color management systems (CMS). Such color management systems serve for color calibration of peripheral apparatuses that participate in a color processing. Such apparatuses are in particular cameras, scanners, monitors and color printers.

A correction 10 of the apparatus-specific color corruptions that conforms the color tones of (for instance) a scanned image, the monitor and a printout occurs via the adaptation of the profiles. It is thereby possible to define the color data in an apparatus-independent color space such as the LAB or CIELAB color space, and then to convert these in the apparatus-independent color space into the apparatus-dependent color space. Standards for the format of such apparatus profiles are developed and published by the International Color Consortium (ICC), for example. Specific apparatus profiles that can be used on various operating systems and user platforms can be generated with the aid of such ICC-conformant profiles. Images can thereby be transferred from one operating system to another operating system without having to change the apparatus profile.

Each apparatus has an apparatus-specific color space that is defined by a coordinate system in which an axis of the coordinate system is associated with each primary color. Every point in this color space defines a specific color. Typical in practice are: the RGB color space for monitors according to the aforementioned RGB color model; the CMYK color space for printers according to the mentioned CMYK color model; the HSB color space according to the HSB color model (hue, saturation, brightness); and the CIELAB color space defined by the Commision Internationale de L'éclairage (International Commission on Illumination=CIE), which is a standardized, idealized color space that numerically describes all colors that a person can perceive.

In the prior art, the output apparatus with the aid of which an image corresponding to the output data is output must already be established in the color conversion and in the color management. An adaptation of the color-describing output data to specific (in particular modified) output properties of a concrete output apparatus are then no longer possible in the prior art.

SUMMARY

It is an object to specify methods and devices to convert color-describing input data suitable for output with the aid of an output apparatus into color-describing output data that are adapted to at least one output property of the output apparatus that influences the graphical output.

In a method to convert color-describing input print data suitable for graphical output with aid of an output apparatus into color-describing output print data, color proportions, defined by the input print data, of at least one region to be inked with at least two color separations, are determined, and a color space value to be generated with aid of the color separations is determined. An association rule is determined to convert the input print data into the output print data while retaining the color space value. A total areal coverage of areal coverages defined by the output print data of the color separations to generate the color space value is reduced relative to areal coverages of the color separations defined by the input print data. The input print data is converted into the output print data with aid of the determined association rule.

BRIEF DESCRIPTION OF THE DRAWINGS

FIG. 13 illustrates the schematic representation of multiple conversion sub-processes to convert CMYK input data into CMYK output data.

DESCRIPTION OF THE PREFERRED EMBODIMENT

Figure 1:
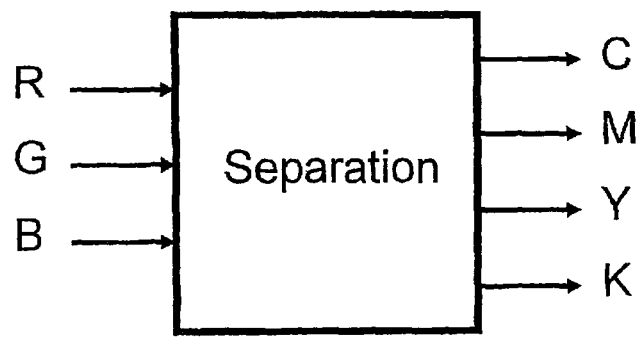
FIG. 1 is a known direct conversion of color-describing RGB input data into color-describing CMYK output data.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

Via the methods and devices according to the preferred embodiment it is achieved that an adaptation of the data to be output can also still occur when color-describing data suitable for graphical output with the aid of an output apparatus already exist. An adaptation of such color-describing data can occur sequentially in multiple processing steps and/or—for individual color separations, objects and/or surface areas—also in parallel with additional color separations objects and/or surface areas. The color-describing data are advantageously processed per color point, per pixel and/or per object. Objects can in particular be processed as color-describing data associated with a specific object and/or as pixel data and as color separation data.

Output properties can in particular be: the primary colors of the output apparatus; the color space reproducible by the output apparatus with the aid of these primary colors; a property of a substrate material to be printed that influences the reproduction; an areal coverage limitation of the maximum color quantity to be applied to a surface area of a substrate material, in particular the maximum toner quantity to be applied to a surface area of a substrate material; and/or at least one fixing property of a fixing unit.

In one preferred embodiment of the invention, both the input data and the output data are print data, whereby print data already present (for example in a print data stream) can be adapted to a selected printer. In this embodiment it is also possible to conform the print images of multiple printers to one another (in particular the print images of identical printers of one printer type) so that these printers, given identical print input data, then generate the same optical impression in an observer. Via this aspect of the preferred embodiment it is also possible to adapt the print image of one printer of a first type to the print image of a printing of a second type differing from the first type, such that this first printer can be used as a proof copy printer to check the print data or the printer's copy for the second printer. Such a proof copy is also designated as a proof, and the first printer with whose help the proof is generated is designated as a proof printer. A printer change during the execution of a print job is thereby also possible given a constant print image in that the print image of the first printer used to execute the print job is adapted to the print image of the subsequent printer used to execute the print job, whereby a uniform appearance of the generated print products/print product is possible.

To better understand the present preferred embodiments, in the following reference is made to these preferred exemplary embodiments shown in the drawings that are described using specific terminology. However, it is noted that the protective scope of the invention should not thereby be limited, since such variations and additional modifications to the shown devices and the methods as well as such additional applications as they are shown therein are viewed as typical present or future expertise of a competent man skilled in the art.

FIG. 1 shows a block diagram for conversion of RGB input data into CMYK output data without color management. An RGB input datum describing a mixed color is thereby converted into a CMYK datum describing the same mixed color with the aid of an established profile. This CMYK datum can be adapted to specific output properties of the output apparatus. With the aid of such an established profile, a corresponding CMYK output datum can be determined with regard to each RGB input datum that describes a specific mixed color. The profiles exist in the form of tables and/or in the form of formulas for calculation of the CMYK output data from the RGB input data. With the aid of such profiles, a largely color-accurate reproduction of the respective mixed colors is achieved in their output with the aid of the output apparatus. However, special requirements of the printer with regard to stability, technical limitations, toner consumption, costs or specific properties in the further processing of the print product cannot be taken into account in such known conversions.

Figure 2:
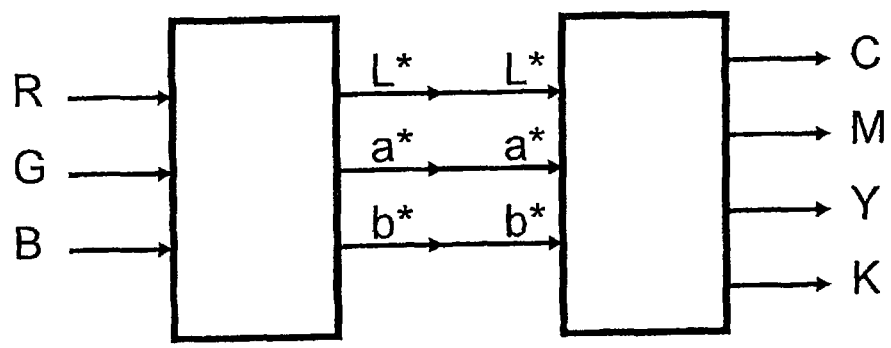
FIG. 2 is a known conversion of color-describing RGB input data into CMYK output data with color management.

A block diagram with an alternative conversion of RGB input data into CMYK output data is shown in FIG. 2. The RGB input data are thereby converted into L*a*b* data of the standardized CIELAB color space, and the L*a*b* data are subsequently converted into CMYK output data. A color management according to the ICC standard of the International Color Consortium to optimize the color values is possible with the aid of this arrangement, wherein special requirements of the printer and/or the additional print processing also cannot be taken into account in this conversion, however.

Figure 3:
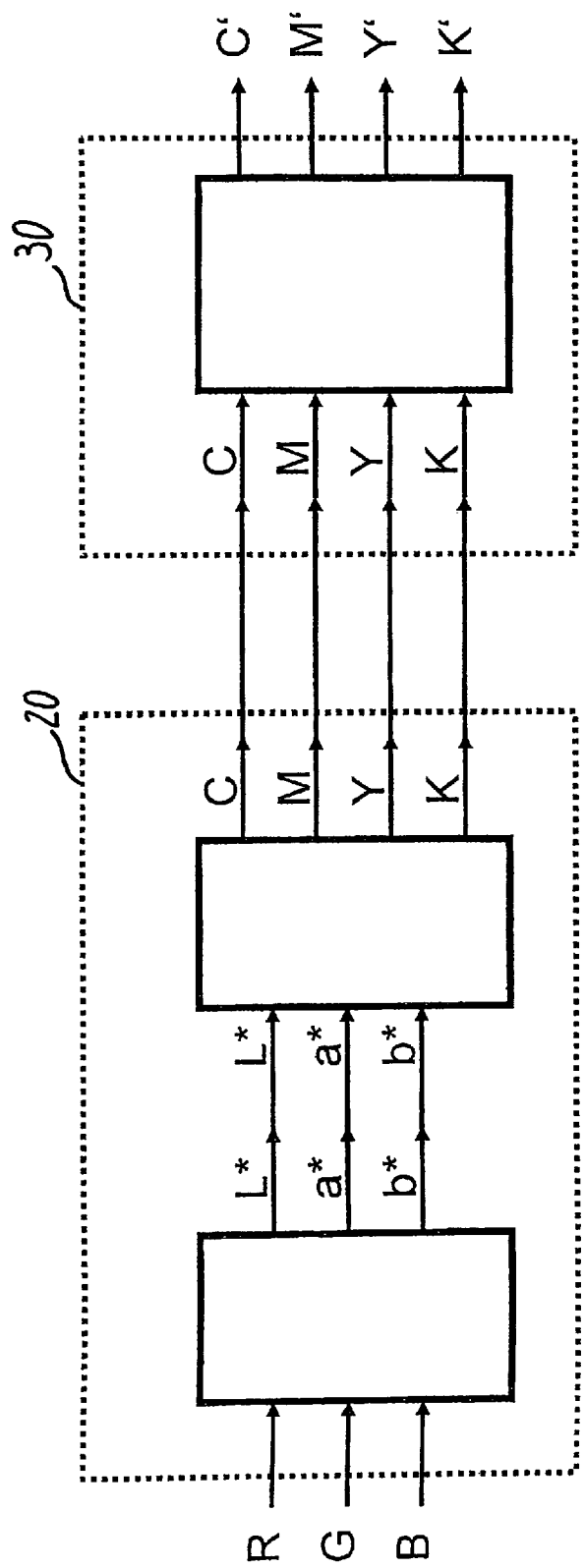
FIG. 3 shows an arrangement to generate adapted color-describing CMYK output data from color-describing RGB input data according to a first aspect of the preferred embodiment.

A block diagram for the conversion of RGB input data into C'M'Y'K' output data is shown in FIG. 3. In the conversion of RGB input data into C'M'Y'K' output data according to FIG. 3, the RGB input data are converted into CMYK data in a first conversion stage 20 as described in connection with FIG. 2. In a second conversion stage 30, the CMYK data are subsequently converted into C'M'Y'K' output data adapted to the output apparatus. The CMYK data are not adapted to the output properties of a specific output apparatus, in particular not to the output properties of a specific printer. The CMYK data are generally equally well suited for a plurality of different output apparatuses and are thus not optimized for most of these output apparatuses. In the conversion of the CMYK data into C'M'Y'K' output data, a profile is used via which the CMYK data are adapted to at least one output property of a concrete output apparatus or to a concrete specification that influences the graphical output with the aid of the output apparatus. These profiles can be used similarly to the profiles for conversion of the RGB input data into CMYK data or the RGB input data into L*a*b* data, as well as of the L*a*b* data into CMYK output data, which can be defined by concrete color values associated in pairs in table form or via an association rule.

The conversion of the RGB input data into C'M'Y'K' output data that is presented in FIG. 3 thus occurs in stages in the first conversion stage 20 (in which the RGB image data are converted into CMYK image data) and in the second conversion stage 30 (in which the CMYK data are converted into C'M'Y'K' output data). In particular the maximum or even the average inking of the entire output image (in particular of a print image) can be limited by the conversion process of the second conversion stage 30. Specific requirements for this image that are required for additional processing of the output image can also be taken into account in the output with the aid of an output apparatus. For example, it can thus be established that, for at least one primary color, the use of this primary color as a full tone (i.e. with 100% areal coverage) is not permissible. This is in particular reasonable when a print image is generated on a substrate material that is subjected to a method for creasing in the further processing of the substrate material.

Specific problematic areal coverage combinations can also be precluded given superposition printing. Such problematic areal coverage combinations are in particular high maximum total degrees of areal coverage of all primary colors printed in superposition at one color point and/or pixel. Special requirements for the long term stability of the printing method can also be taken into account via the additional conversion process of the second stage 30. Specific properties in different printing conditions that in particular result from the material properties of the substrate material (for example from the material properties of a paper to be printed, from the inking process in the image generation process and from the type of the print job) can also be taken into account. A targeted adaptation of color settings with the aid of the conversion process implemented in the second conversion stage 30 can also occur via which the output image is output lighter, darker, more colorful, with reduced color, in higher contrast, in lower contrast and/or such that a primary and/or mixed color is specially introduced and the output image has a color cast in this color (for example a green cast). Such adaptations can be specifically set for a concrete output job via the selection of a conversion process with a suitable profile.

Figure 4:
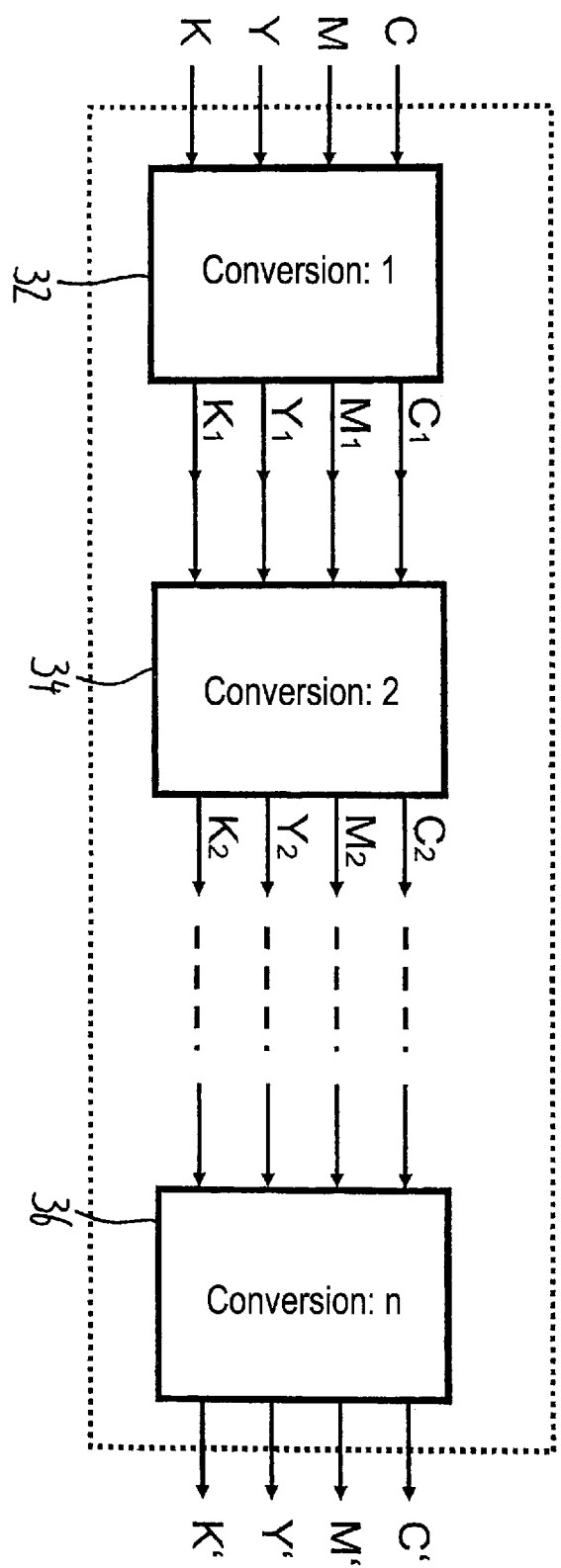
FIG. 4 illustrates the generation of adapted color-describing CMYK output data from color-describing CMYK input data with the aid of multiple chained conversion processes to be executed sequentially, according to a second aspect of the preferred embodiment.

A block diagram for multi-stage conversion of CMYK input data into C'M'Y'K' data is presented in FIG. 4. The conversion occurs in a first conversion stage 32 to convert the CMYK input data into C(1),M(1),Y(1),K(1) data that are then converted in a second conversion stage 34 into C(2),M(2),Y(2),K(2) data, and that possibly are converted into additional CMYK data in additional conversion stages before they are converted in the third conversion stage 36 into C'M'Y'K' output data. A chaining of multiple conversions or conversion processes of CMYK input data into C'M'Y'K' output data via the sequential conversion of these CMYK input data in multiple stages thus occurs in the exemplary embodiment according to FIG. 4. The CMYK input data have advantageously been generated with the aid of a color management system.

Figure 5:
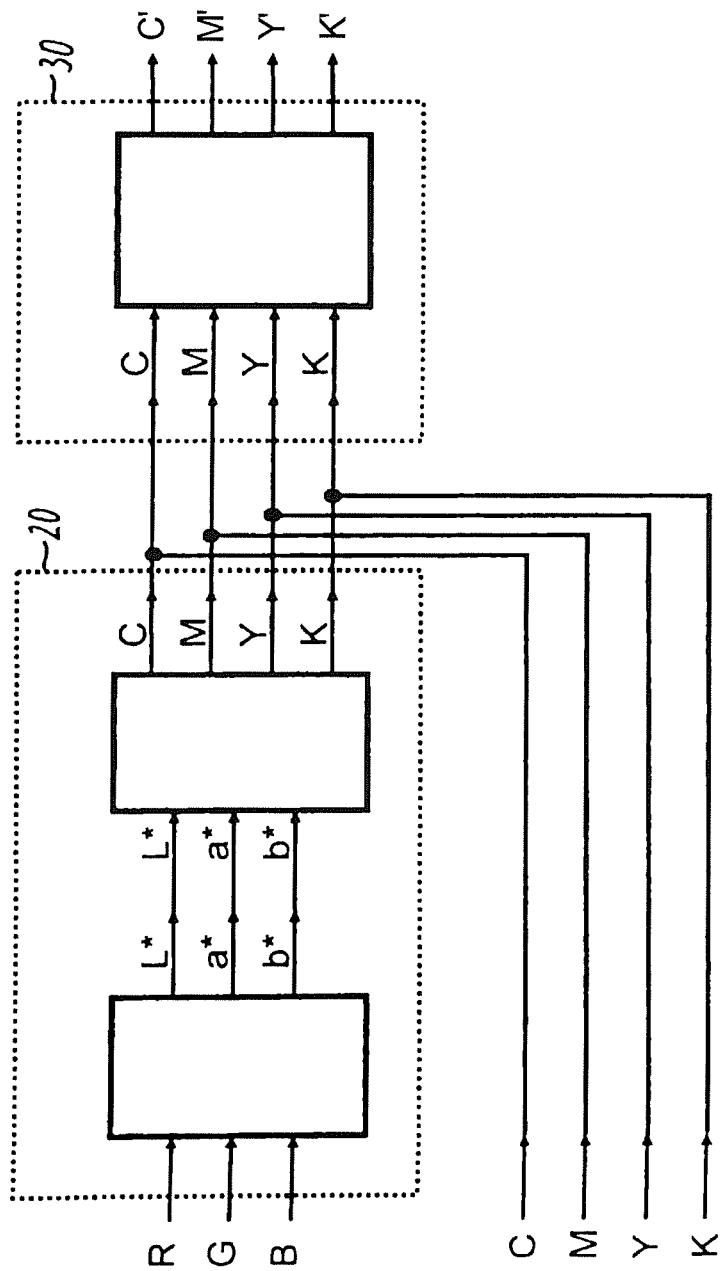
FIG. 5 is an arrangement to convert color-describing RGB input data into color-describing CMYK output data according to FIG. 3, wherein a bypass is provided to supply specific objects already defined with the aid of color-describing CMYK input data.

Shown in FIG. 5 is a block diagram via which the RGB input data are converted into CMYK data in a first conversion stage 20 in a manner similar to as in FIG. 3, which CMYK data are subsequently converted into C'M'Y'K' data in the second conversion stage 30. The first conversion stage 20 is not required for individual objects that are already defined by color-describing CMYK data, such that these are directly supplied to the second conversion stage 30. The CMYK data of these objects are then supplied to the second conversion stage 30 together with the CMYK data generated from the RGB data and are converted into C'M'Y'K' data. The C'M'Y'K' data of the specific objects are then advantageously superimposed on the CMYK data generated from the RGB data via the conversion process of the first conversion stage 20. The CMYK data of the specific objects are thus supplied to the second conversion stage 30 via a bypass, circumventing the first conversion stage 20, and are converted into C'M'Y'K' data in the second conversion stage 30 in the same manner as the CMYK data output from the first conversions stage 20.

Figure 6:
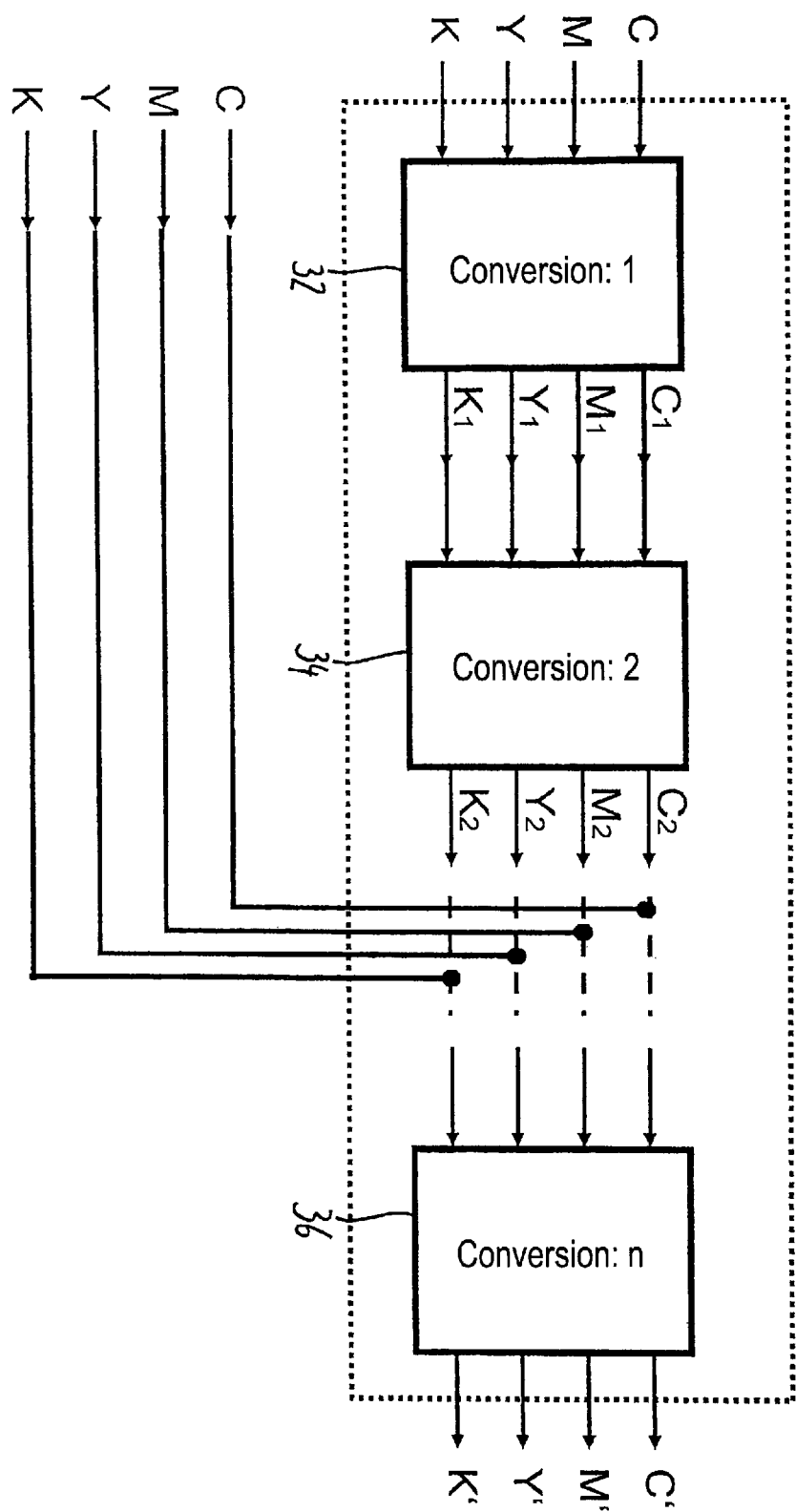
FIG. 6 shows multiple conversion processes according to FIG. 4 that are to be sequentially executed, wherein color-describing image data of at least one specific object are supplied via a bypass, such that only a portion of the conversions to generate output data is implemented for the image data of the object.

In the exemplary embodiment according to FIG. 6, CMYK data (presented in the same manner as in FIG. 4) are sequentially converted into C'M'Y'K' data in multiple conversion stages 32, 34, 36, wherein a bypass for at least one specific object that is described by CMYK data is provided in the embodiment according to FIG. 6. The CMYK data of the object are not converted with the aid of conversion processes of the conversion stages 32 and 34; rather, they are supplied to the conversion workflow only after the conversion stage 34 and before the conversion stage 36, wherein they are superimposed with the C(2),M(2),Y(2),K(2) data converted with the aid of the conversion stages 32 and 34. The data superimposed on one another are then jointly converted into C'M'Y'K' data with the aid of conversion stage 36. The CMYK data supplied to the first conversion stage 32 are advantageously generated with the aid of a color management system, whereby the CMYK data that are output by the color management system are supplied to the conversion stage 32 as input data.

Figure 7:
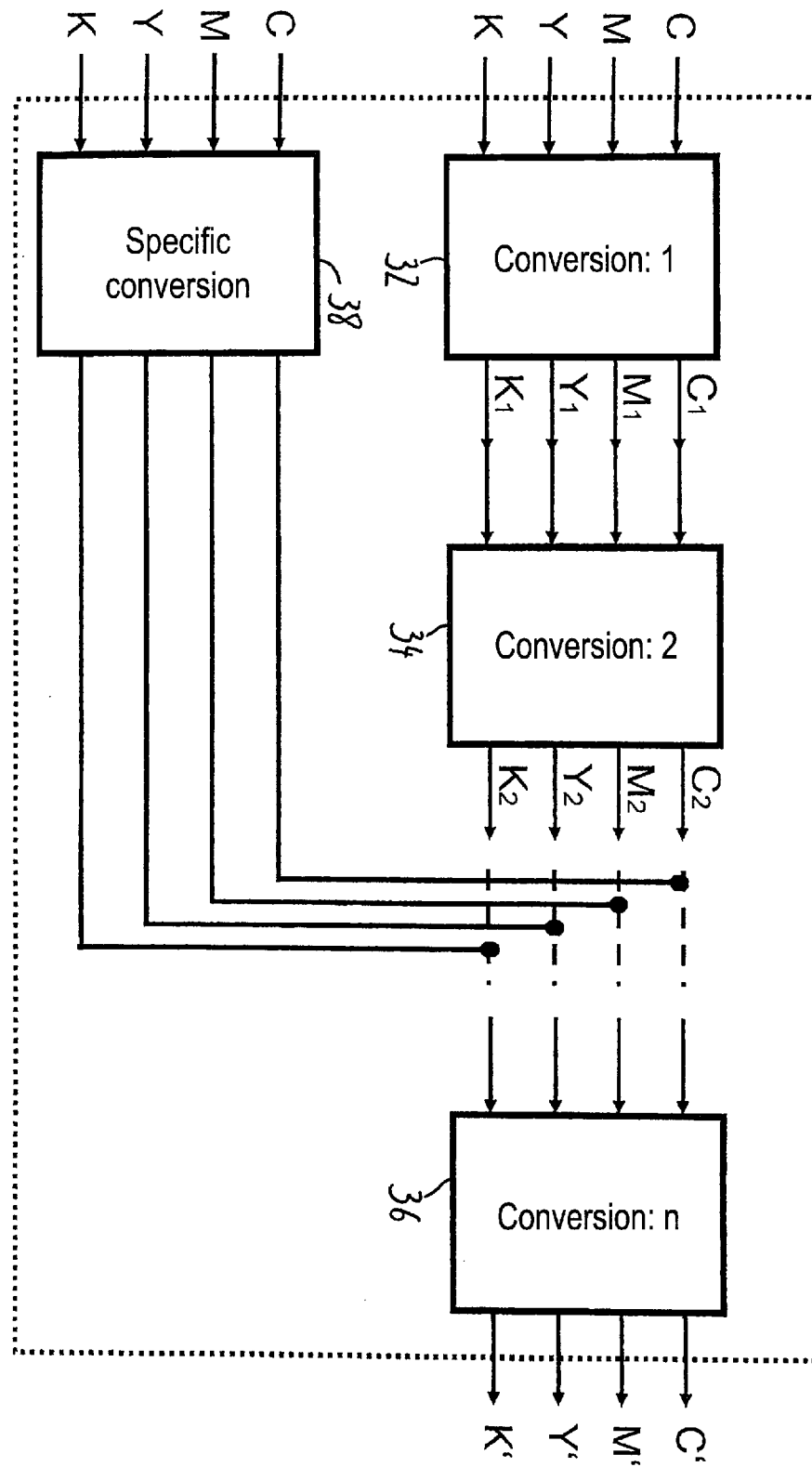
FIG. 7 shows the arrangement according to FIG. 6, wherein a specific conversion process is provided for the image data defining the specific object, which image data are supplied via the bypass.

The arrangement according to FIG. 6 is shown in FIG. 7, wherein an additional conversion stage 36 for conversion of the CMYK describing the specific object (which are then supplied via the bypass) is provided in the bypass branch. A special conversion of the CMYK data of the specific object thus occurs before the data describing the object are superimposed on the C(2),M(2),Y(2),K(2) data output by conversion stage 34 in order to then be jointly converted into C'M'Y'K' data with the aid of conversion stage 36. Alternatively or additionally, additional conversion stages to convert the CMYK data before supplying the additional CMYK data can be provided via the bypass, meaning that additional stages are provided upstream or downstream of the first conversion stage 32 and/or the second conversion stage 34. Furthermore, additional conversion stages before or after the conversion stage 36 are possible in order to subject all of the CMYK data (including the CMYK data supplied via the bypass) to additional conversion stages and conversion methods. The conversions of the CMYK data of the specific object that are implemented with the aid of conversion stage 38 can also alternatively be implemented in multiple conversion stages that are to be executed sequentially.

Additional conversion stages to convert CMYK data that are sequentially executed can be provided in an identical manner in the embodiments of FIGS. 4 and 6. Given such a sequential conversion of CMYK data, the CMYK output data of a first conversion stage 32 are used as input data of a subsequent second conversion stage 34 etc.

Figure 8:
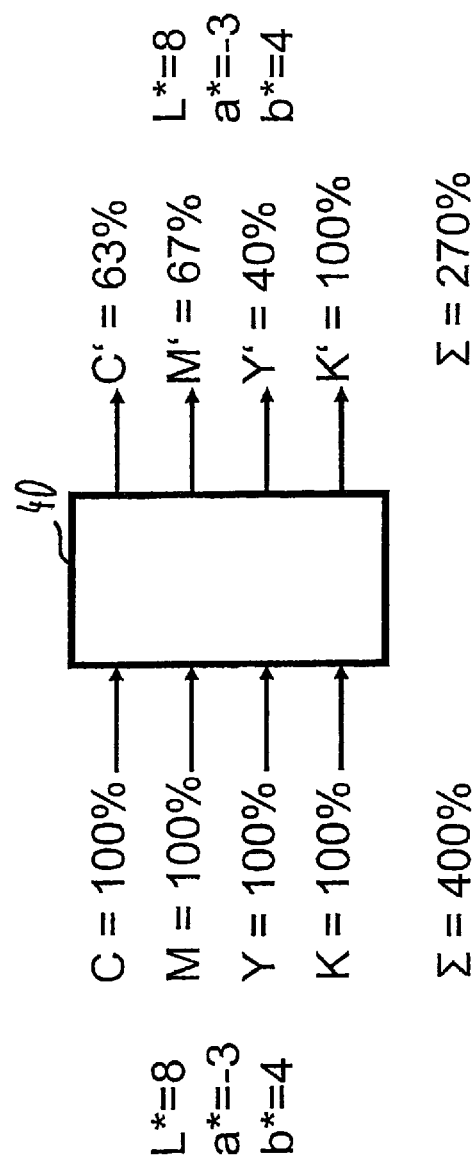
FIG. 8 shows a conversion process of color-describing CMYK input data into color-describing C'M'Y'K' output data with a reduced degree of total areal coverage.

The conversion of CMYK input data into C'M'Y'K' output data with the aid of a conversion stage 40 is schematically shown in FIG. 8. The conversion of the CMYK data into C'M'Y'K' data via the conversion stage 40 can be implemented in multiple intermediate stages, similar to as described in connection with FIGS. 3 through 7. The areal coverage of the color separations of the primary colors according to the CMYK input data is respectively 100%, such that the entire areal coverage of the mixed color of a print image generated with the aid of these CMYK input data is 400% in the CIELAB color space, that corresponds to color values of $L^*=8$, $a^*=-3$ and $b^*=4$. With the aid of conversion stage 40, the areal coverages of the colors cyan, magenta, yellow, black are reduced while retaining the CIELAB color space value of $L^*=8$, $a^*=-3$ and $b^*=4$ of the mixed color of the print image generated with the aid of the C'M'Y'K' output data, wherein cyan (C') has an areal coverage of 63%, magenta (M') has an areal coverage of 67%, yellow (Y') has an areal coverage of 40% and black (K') has an areal coverage of 100%. A total areal coverage of 270% results for the print image generated with the aid these C'M'Y'K' output data. The areal coverage can thereby be reduced from 400% to 270% (and thus by 130%) with the aid of conversion stage 40 while maintaining color value. It is noted that the exemplary indicated CMYK color values or the C'M'Y'K' color values pertain to at least one color point or pixel with this specific color value.

Conversion stage 40 in particular takes into account the color presentations of the output apparatus, the actual color values of the primary colors in the reproduction of these primary colors on the specific substrate material to be printed, and the color values of mixed colors generated with these specific primary colors of the output apparatus. Additional or alternative special requirements of the concrete applications can additionally be taken into account with the aid of conversion stage 40. These requirements can in particular pertain to the degree of total areal coverage, the omission of dot touches in the halftone range of the individual colors, the minimal degree of areal coverage of the individual colors, the avoidance of Moiré etc.

Figure 9:
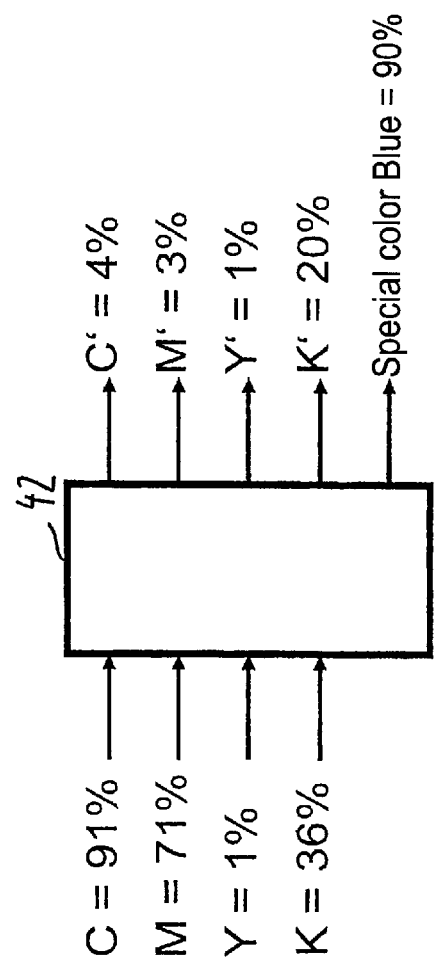
FIG. 9 shows a conversion process of color-describing CMYK input data into color-describing output data of the primary colors CMYK as well as the special color blue.

In FIG. 9 is a conversion stage 42 to convert CMYK data into C'M'Y'K'S data, wherein S is the special color blue. In the exemplary embodiment shown in FIG. 9, a mixed color with 91% areal coverage of the color cyan, 70% areal coverage of the color magenta, 1% areal coverage of the color yellow, 36% areal coverage of the color black are converted into a mixed color with 4% areal coverage of the color cyan, 3% areal coverage of the color magenta, 1% areal coverage of the color yellow, 20% areal coverage of the color black and 90% areal coverage of the special color blue with the aid of conversion stage 42. As already mentioned in connection with FIG. 8, this conversion can also occur in multiple sub-stages. The special color blue present in the concrete output apparatus is thus also used to output mixed colors, whereby the available color space of the output apparatus can be increased dependent on the concrete special color and the degree of total areal coverage for the concrete mixed color can simultaneously be decreased from 199% to 118%.

Figure 10:
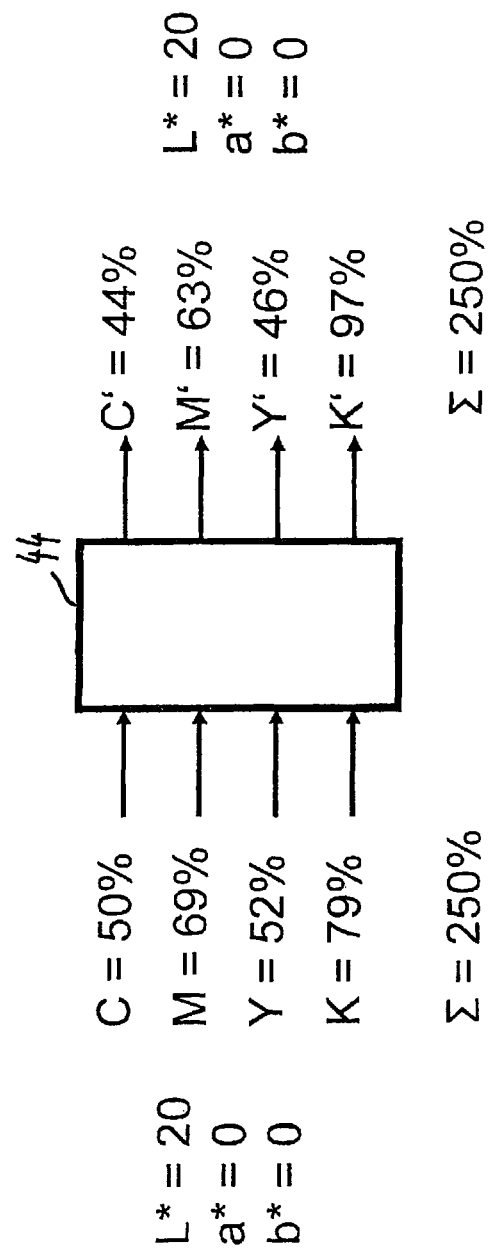
FIG. 10 illustrates a conversion process of color-describing CMYK input data into color-describing C'M'Y'K' output data with a constant degree of areal coverage and identical mixed color.

A block diagram to convert CMYK data into C'M'Y'K' output data given the same areal coverage of a mixed color generated with the aid of the input data and the mixed color generated with the aid of the output data, as well as with the same color value in the CIELAB color space, is shown in FIG. 10 with the aid of a conversion stage 44. The input image data describe a 50% areal coverage of the color cyan, a 69% areal coverage of the color magenta, a 52% areal coverage of the color yellow and a 79% areal coverage of the color black. The output image data comprise a 44% areal coverage of the color cyan, a 63% areal coverage of the color magenta, a 46% areal coverage of the color yellow and a 97% areal coverage of the color black. The areal coverage ratio of the colors cyan, magenta and yellow can thus respectively be reduced via this conversion with the aid of conversion stage 44, wherein the same mixed color is generated in the CIELAB color space of $L^*=20$, $a^*=0$ and $b^*=0$. The ratio of the black color has been increased. Black dye or black toner is more cost-effective than toner of the colors cyan, magenta and yellow, in particular in electrophotographic printers, such that costs can be saved via the conversion with the aid of conversion stage 44. Problematic areal coverage combinations of the employed primary colors can thus in particular be converted into more advantageous combinations.

Figure 11:
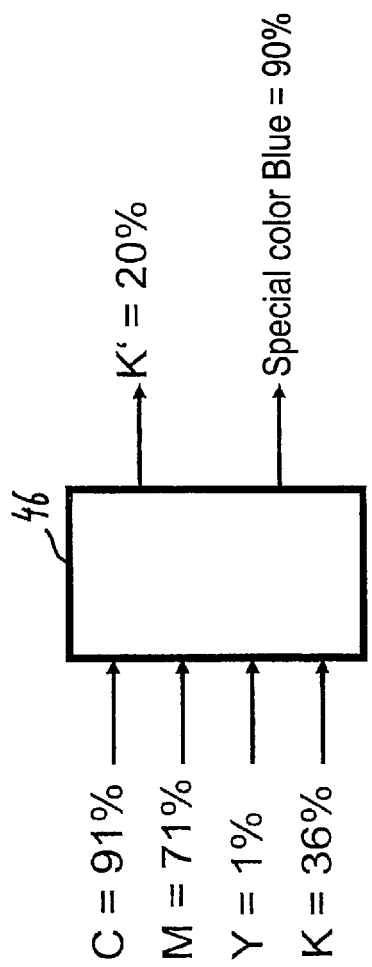
FIG. 11 illustrates a conversion process of color-describing CMYK input data into color-describing output data of the color black and the special color blue.

A block diagram of a conversion stage 46 to convert CMYK into K, S data (i.e. into color-describing data of the colors black and a concrete special color blue) is shown in FIG. 11. The input data with 91% areal coverage proportion of the color cyan, a 71% areal coverage proportion of the color magenta, a 1% areal coverage proportion of the color yellow and a 36% areal coverage of the color black are converted into color-describing output data with a 20% areal coverage proportion of the color black and with a 90% areal coverage proportion of the special color blue. The mixed color made from the 20% areal coverage proportion of the color black and the 90% areal coverage proportion of the special color blue generates in an observer a similar optical impression (in particular a similar brightness impression) as a mixed color generated with the CMYK input data. Such a conversion is in particular required given the printout of full color images with the aid of a printer with two colors, namely with black and a special color. Such a two-color printing is also designated as highlight color printing. Instead of the color black, a second special color different from the first can be used. Given such a highlight color printing it is also possible to use the color black and an additional input primary color (for example the color cyan, magenta or yellow) as a second color. A highlight color printing is also possible with three, four or more colors, wherein at least one of the colors cyan, magenta, yellow or black does not need to be available for output with the aid of the printer.

Figure 12:
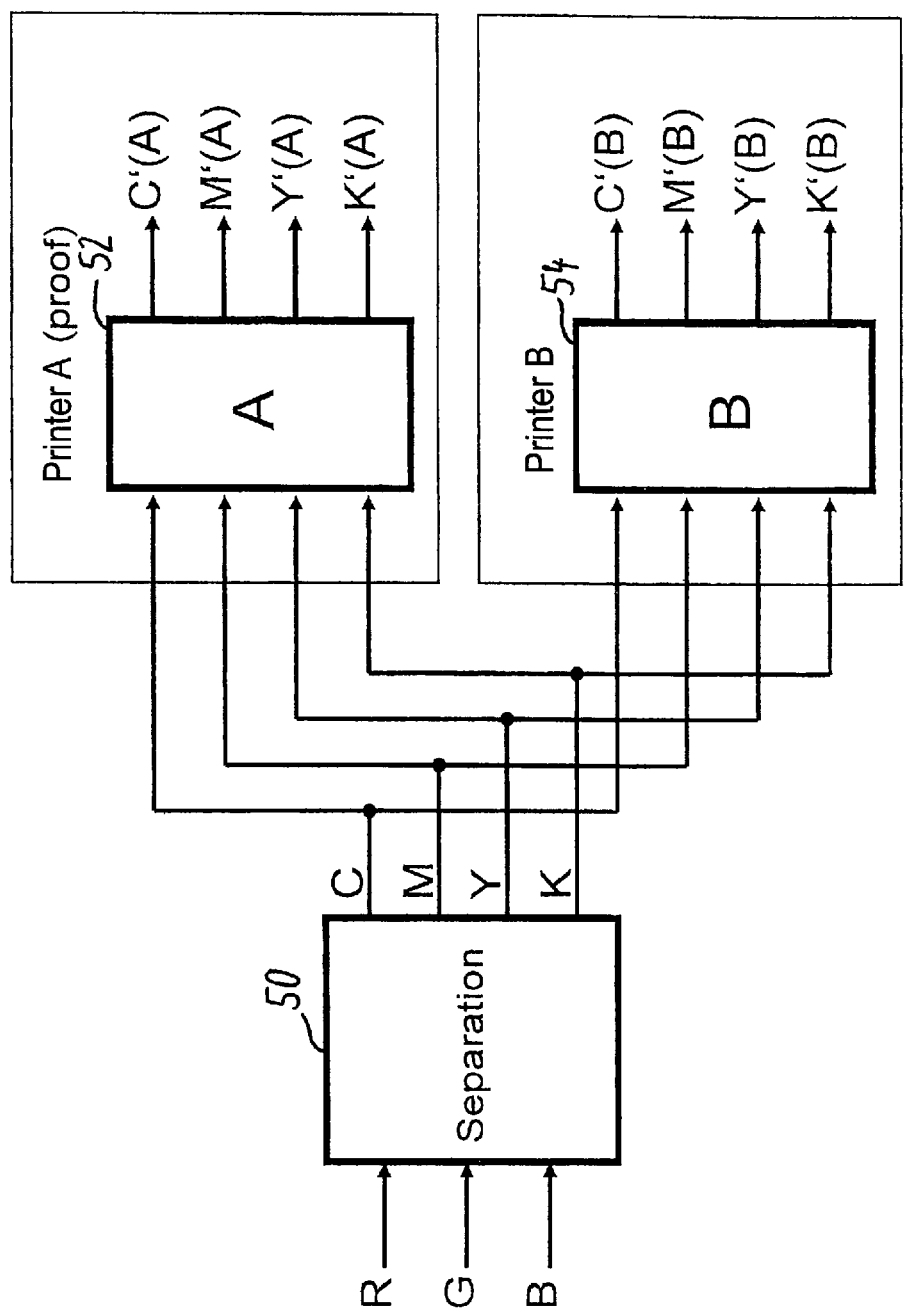
FIG. 12 shows A conversion of color-describing RGB input data into color-describing CMYK data as well as a subsequent apparatus-specific conversion of the color-describing CMYK data into C'M'Y'K' output data adapted to a specific printer to match multiple printers.

A block diagram to convert RGB data into at a printer selected as an output apparatus with the aid of a print-independent conversion stage 50 and a print-specific conversion stage 52, 54 is shown in FIG. 12. In this embodiment, a first printer A (which serves as what is known as a proof printer) and a second printer B that is executed as a high-capacity printer are available for selection for outputting a print image. The RGB image data are converted into CMYK data in a first conversion stage 50. These CMYK data are supplied to a second conversion stage 52 in order to generate C'(A), M'(A), Y'(A), K'(A) data that are then output with the aid of the proof printer A.

For output with the aid of the high-capacity printer B, the CMYK data output by the conversion stage 50 are supplied to a second conversion stage 54 that converts from CMYK data into C'(B), M'(B), Y'(B), K'(B) data that are adapted for output with the aid of the high-capacity printer B. The C'(B), M'(B), Y'(B), K'(B) data generated with the aid of the second conversion stage 54 are adapted to at least one output property that is dependent on the printer A, B itself, the concrete substrate material to be printed or a requirement of the pre- or post-processing of the substrate material. The second conversion stage 52 to adapt the CMYK data to C'(B), M'(B), Y'(B), K'(B) data converts the data such that the same print result is generated by the printer A with the aid of the C'(A), M'(A), Y'(A), K'(A) data as by the printer B with the aid of the C'(B), M'(B), Y'(B), K'(B) data. The translation of the input color data into output color data is thus used to conform multiple printers of a series or different series or of a charge or different charges to one another, and thus to make various printers or printer types compatible with regard to the input data, such that uniform profiles can be worked with in the first conversion stage 50. The processing of the CMYK data by the second conversion stages 52, 54 can thereby be implemented in a control unit of the printer itself, and the conversion of the RGB data into CMYK data can occur via the conversion stage 50 in an upstream process, in particular with the aid of a color management system, an application program or in a print server.

The print images of multiple printers or copiers of the same type are compared with one another in the calibration with the aid of the described conversion. The printers or copiers of the same type are in particular the printers of the same series of a manufacturer. A calibration of the print images of the printer or copiers of the same type advantageously occurs via a printer-specific profile.

The print image of a first printer or first copier of a first type can be adapted to the print image of a second printer or second copier of a second type in the same manner. The second printer or second copier advantageously has a different design than the first printer or copier. The first printer or first copier of the first design has in particular been manufactured by a first manufacturer and the second printer or second copier of the second design has been manufactured by a second manufacturer.

The conversion stages 56 through 62 to convert CMYK input data into C'M'Y'K' output data are presented in FIG. 13, wherein it is indicated that the individual conversion stages 56 through 62 can be combined with one another in an arbitrary suitable order and can be executed sequentially in this suitable order. The conversion of the input data into output data is thus implemented via multiple sub-processes connected in series that can be exchanged individually or in groups for additional processes to execute suitable conversion stages 56 through 62.

The profiles used by the individual conversion stages and conversion processes can be stored as an ICC profile, wherein ICC profiles and non-ICC-conformant profiles can be combined with one another in individual stages (i.e. can be executed sequentially). The combination of ICC-conformant profiles with non-ICC-conformant profiles is also possible in the production of color-describing data supplied via a bypass. Alternatively or additionally, profiles to convert the data in individual stages can be stored in the form of formulas or equations, wherein the function described by the respective formula can be determined with the aid of reference measurements, for example. The conversion of the data occurs in the workflow for image output, advantageously between the data acquisition and the halftone screening of the print images, in particular the halftone screening of the color separations of the individual primary colors. The concrete settings to convert the data into the individual conversion stages can thereby be made inaccessible to a user, wherein the translation of the color data can be permanently integrated into the workflow so that this conversion cannot be skipped by a user. Depending on the embodiment, individual or multiple conversions act only in a specific color range in color space without altering the data in another range. This procedure can in particular be used to limit the degree of total areal coverage. Alternatively, the input data are adapted over the entire color range of the available color space and corresponding output data are generated.

As already mentioned, color-describing input data that are based on a specific number of primary colors (for example the four primary colors cyan, magenta, yellow and black) can be converted with the aid of the conversions according to the preferred embodiment into color-describing output data that are based on different primary colors or on a smaller number of primary colors, for example on the three primary colors cyan, magenta and yellow.

Via the conversion according to the preferred embodiment, concrete properties of the output apparatus and/or requirements for the print image to be generated and/or the print product to be generated can be taken into account in a simple manner with the aid of the methods and devices according to the preferred embodiment in that print data specifically adapted to these requirements are generated. The adaptation of the data supplied to the printer thus extends beyond a purely calorimetric adaptation of the transfer properties. A first profile to convert RGB data into CMYK data is in particular provided; the additional conversions with additional profiles are downstream. One of these profiles can then limit and/or reduce the total inking, for example. Alternative or additional profiles can produce supplementary conversions of the color data. Multiple such additional profiles can also be combined into one further profile. However, the provision of multiple conversion stages for specific property adaptations has the advantage of being able to flexibly combine these. The selection of the correct and required conversion stages for the respective requirements for the printed product as well as the required adaptation to the respective print environment can be implemented either by the user himself or by an automatic management system. Via the provision of an inking limitation stage with the aid of an inking limitation profile as a last conversion stage before a screening process, it can be ensured that the printer is not operated in an unstable operating state. The productivity of the printer can in particular be increased with the omission of a primary color present in the output system since the color separation of this color does not need to be generated in the printing process. The required ink quantity (and thereby costs) can be reduced by using an additional primary color, whereby costs to produce a print product can be decreased.

The input data in particular concern an input data set with tone value combinations to characterize a four-color printing process that pertains to one dark (for example chromatic) color, for example with three lighter chromatic colors. These colors are in particular cyan, magenta, yellow and black. The output data set advantageously likewise comprises tone value combinations to characterize a four-color printing with one dark chromatic color with three lighter chromatic colors.

Two or three conversion stages are advantageously provided to adapt input data not adapted to the output properties of a concrete printed into output data adapted to the output properties.

The preferred embodiment is in particular suited to be realized as a computer program (software). It can therefore be distributed as a computer program module as a file on a data medium such as a diskette, CD-ROM or DVD, or as a file via a data or communication network. Such comparable computer program products or computer program elements are embodiments of the invention. The design according to the preferred embodiment can be implemented in a computer, in a printing apparatus or in a printing system with upstream or downstream data processing apparatuses. Suitable control and/or data processing units that in particular are executed as a computer and with whose help the preferred embodiment is applied can thereby contain additional known technical devices such as input units (keyboard, mouse, touchscreen), at least one microprocessor, at least one data and/or control bus, at least one display device (monitor, display) as well as at least one working memory, a disk storage and a network card.

Although a preferred exemplary embodiment has been shown and described in detail in the drawings and in the preceding specification, it should be viewed as merely exemplary and not as limiting the invention. It is noted that only the preferred exemplary embodiment is presented and described, and all variations and modifications that presently and in the future lie within the protective scope of the invention should be protected.

We claim as our invention:

1. A method to convert color-describing input print data suitable for graphical output with the aid of an output apparatus into color-describing C,M,Y,K output print data, comprising the steps of:
  determining color proportions, defined by the input print data, of at least one region to be inked with at least two color separations, and determining a color space value to be generated with aid of said color separations;
  determining an association rule to convert the input print data into the C,M,Y,K output print data while retaining the color space value, wherein a total areal coverage of areal coverages defined by the output print data of the color separations to generate the color space value is reduced for C,M, and Y but not K wherein K total areal coverage therefore remains the same, relative to areal coverages of the color separations defined by the input print data; and
  converting the input print data into the C,M,Y,K output print data with aid of the determined association rule.

2. A method according to claim 1 wherein the input print data comprise color separations of a first number of primary colors, and the output print data comprise color separations of a second number of primary colors, wherein the color separations are associated with at least one of primary colors, objects, and individual pixels.

3. A method according to claim 2 wherein the first number of primary colors is greater than the second number of primary colors, or wherein the first number of primary colors is less than the second number of primary colors.

4. A method according to claim 2 wherein the first number of primary colors is equal to the second number of primary colors.

5. A method according to claim 1 wherein an output property of a printer or copier that influences the graphical output is determined, and the association rule is also established dependent on the determined output property of the printer or copier that influences the graphical output.

6. A method according to claim 5 wherein the output property is influenced by at least one material property of a substrate material to be printed; by an areal coverage limitation of the maximum toner quantity to be applied on an areal region of a substrate material; or by a fixing property of a fixing station.

7. A method according to claim 5 wherein the output property of an image to be output with aid of the output print data is established dependent on at least one color reproduction property of a concretely determined output apparatus.

8. A method according to claim 5 wherein the at least one output property of an image to be output with aid of the output print data is determined dependent on a default setting or requirements of an application.

9. A method according to claim 5 wherein the output property concerns a possible output color space of an output apparatus; a limited output color space of an output apparatus; output colors of the output apparatus; a limitation of output colors of the output apparatus to at least two output colors selected from the possible output colors; a preset, maximum degree of total areal coverage; omission of dot touches in a half tone range of the individual colors;
  a minimum degree of areal coverage of at least one primary color of the output apparatus; or avoidance of Moiré.

10. A method according to claim 1 wherein at least one primary color of the input print data coincides with a primary color of the output print data in the color space or with a general color designation of the primary color.

11. A method according to claim 1 wherein all mixed color values described by the color-describing output print data lie within a color space determined by primary color combinations of an output apparatus that can be output.

12. A method according to claim 1 wherein the association rule comprises a calculation rule with whose help the output print data are calculated from the input print data, or with whose help a color value association table is generated with which a color-describing output datum is associated with a color-describing input datum, wherein at least one parameter of the association rule is set dependent on the output property or dependent on output parameters of an output apparatus; or wherein the association rule or the calculation rule are determined with aid of reference measurements.

13. A method according to claim 1 wherein the association rule is established via selection of a suitable color value association table from a plurality of selectable color value association tables.

14. A method according to claim 1 wherein the color-describing output print data contain an additional primary color relative to the color-describing input print data.

15. A method according to claim 1 wherein color-describing input print data based on the primary colors cyan, magenta, yellow and black or cyan, magenta and yellow are converted into the color-describing output print data based on at least one special color or at least one special color and a color black.

16. A method according to claim 1 wherein the method comprises a component of a workflow for printing documents with aid of a printer or copier, wherein the method is automatically executed in the workflow.

17. A system to convert color-describing input print data suitable for graphical output with the aid of an output apparatus into color-describing C,M,Y,K output print data, comprising:
  a first unit to determine color proportions, defined by the input print data of a region to be inked with at least two color separations, and determining the color space value to be generated with aid of said color separations;
  a second unit to determine an association rule to convert the input print data into the C,M,Y,K output print data while retaining the color space value, wherein a total areal coverage of areal coverages defined by the output print data of the color separations to generate the color space value is reduced for C,M, and Y but not K wherein K total areal coverage therefore remains the same, relative to areal coverages of the color separations defined by the input print data; and
  a third unit to convert the input print data into the C,M,Y,K output print data with aid of the determined association rule.

* * * * *